United States Patent
Ren

(10) Patent No.: US 9,941,675 B2
(45) Date of Patent: Apr. 10, 2018

(54) SWITCH CABINETS FOR USE IN ELECTRICAL SWITCHGEAR AND METHODS OF ASSEMBLING THE SAME

(71) Applicant: GENERAL ELECTRIC COMPANY, Schenectady, NY (US)

(72) Inventor: Xuhui Ren, Shanghai (CN)

(73) Assignee: GENERAL ELECTRIC COMPANY

( * ) Notice: Subject to any disclaimer, the term of this patent is extended or adjusted under 35 U.S.C. 154(b) by 122 days.

(21) Appl. No.: 14/964,640

(22) Filed: Dec. 10, 2015

(65) Prior Publication Data
US 2016/0172826 A1    Jun. 16, 2016

(30) Foreign Application Priority Data
Dec. 16, 2014    (CN) .......................... 2014 1 0783744

(51) Int. Cl.
| H02B 11/02 | (2006.01) |
| H02B 13/00 | (2006.01) |
| H02B 1/26 | (2006.01) |
| H02B 1/00 | (2006.01) |

(52) U.S. Cl.
CPC ............. *H02B 11/02* (2013.01); *H02B 13/00* (2013.01); *H02B 1/00* (2013.01); *H02B 1/26* (2013.01)

(58) Field of Classification Search
None
See application file for complete search history.

(56) References Cited

U.S. PATENT DOCUMENTS

| 2,594,075 A | 4/1952 | Rugg |
| 3,914,659 A | 10/1975 | May et al. |
| 4,233,643 A | 11/1980 | Iverson et al. |
| 5,450,280 A | 9/1995 | Wactor |
| 5,757,260 A | 5/1998 | Smith et al. |
| 7,790,994 B2 | 9/2010 | Mason |
| 8,018,317 B2 | 9/2011 | Lindqvist et al. |
| 8,218,294 B2 | 7/2012 | Fretwell et al. |
| 2009/0267466 A1* | 10/2009 | Zook ........................ E05C 9/043 312/223.6 |

(Continued)

FOREIGN PATENT DOCUMENTS

| CN | 2667751 Y | 12/2004 |
| CN | 201478727 U | 5/2010 |
| EP | 1983625 A1 | 10/2008 |

OTHER PUBLICATIONS

Reyrolle Pacific, "LMVP 12 Kv Indoor Switchgear", pp. 15, Jul. 2014.

(Continued)

*Primary Examiner* — Dimary Lopez Cruz
*Assistant Examiner* — Zhengfu Feng
(74) *Attorney, Agent, or Firm* — GE Global Patent Operation; Stephen G. Midgley

(57) ABSTRACT

A switch cabinet includes a pair of opposing side panels. At least one side panel of the pair of side panels includes an opening defined therein. The switch cabinet also includes at least one component removal system coupled to the at least one side panel. The component removal system is selectively movable between a first position to prevent withdrawal of an electrical component through the opening and a second position to enable withdrawal of the electrical component through the opening.

14 Claims, 7 Drawing Sheets

(56) References Cited

U.S. PATENT DOCUMENTS

2011/0140887 A1* 6/2011 Pudney .................. G06Q 10/08
340/540
2012/0218065 A1* 8/2012 Gerovac .................. H02B 1/50
336/65
2012/0267991 A1 10/2012 Adducci et al.

OTHER PUBLICATIONS

Unofficial English translation of Office Action and Search Report issued in connection with corresponding CN Application No. 201410783744.5 dated Jun. 2, 2017.

* cited by examiner

US 9,941,675 B2

SWITCH CABINETS FOR USE IN ELECTRICAL SWITCHGEAR AND METHODS OF ASSEMBLING THE SAME

BACKGROUND

The field of the disclosure relates generally to electrical switchgear and, more particularly, to switch cabinets for use in electrical switchgear.

Electrical systems, such as power generation, power transmission, power distribution, and power conversion systems, often include switchgear used to control, protect, and/or isolate electrical equipment within the electrical system. Switchgear often serves as connectors between power supplies and power loads to protect and control high voltage circuits. Switchgear generally includes a switch cabinet that houses a switch unit that includes bus bars, electrical cables, circuit breakers, electrical switches, and/or fuses electrically connected in a desired manner to control, protect, and/or isolate the electrical equipment of electrical systems. Circuit breakers generally include contact arms and a trip mechanism electrically coupled in series between the contact arms. Contact arms in circuit breakers are used to provide electrical connections between the circuit breaker and various components of switchgear.

At least some known switch cabinets include components which are mounted in close proximity to one another to provide a switch cabinet having a smaller volume. Furthermore, at least some known switch cabinets include two switch units and so house twice as many electrical components as a switch cabinet housing only a single switch unit. In such cases, some of the components within the switch cabinet are difficult to access for maintenance or replacement from the front or rear of the switch cabinet. Therefore, a continuing need exists for an improved switch cabinet that enables electrical components housed therein to be more easily and quickly access and assessed.

BRIEF DESCRIPTION

In one aspect, a switch cabinet is provided. The switch cabinet includes a pair of opposing side panels. At least one side panel of the pair of side panels includes an opening defined therein. The switch cabinet also includes at least one component removal system coupled to the at least one side panel. The component removal system is selectively movable between a first position to prevent withdrawal of an electrical component through the opening and a second position to enable withdrawal of the electrical component through the opening.

In another aspect, a switch device is provided. The switch device includes a switch cabinet including a pair of opposing side panels. At least one side panel of the pair of side panels includes an opening defined therein. The switch device also includes at least one electrical component housed within the switch cabinet and a component removal system coupled the at least one side panel. The component removal system is selectively movable between a first position to prevent withdrawal of the at least one electrical component through the opening and a second position to enable withdrawal of the at least one electrical component through the opening.

In yet another aspect, a method of assembling a switch cabinet is provided. The method includes providing a pair of opposing side panels and forming an opening in at least one side panel of the pair of side panels. The method also includes coupling a component removal system to the at least one side panel. The component removal system is selectively movable between a first position to prevent withdrawal of an electrical component through the opening and a second position to enable withdrawal of the electrical component through the opening.

DETAILED DESCRIPTION

The systems, method, and apparatus described herein facilitate removing an electrical component from an opening defined in a side panel of switch cabinet. In particular, the systems, method, and apparatus described herein actuate a component removal system between a first position that prevent withdrawal of the component through the opening and a second position to enable withdrawal of the component through the opening. Actuating the component removal system into the second position disconnects the electrical component and opens a hatch coupled within the side panel opening to enable the electrical component to be withdrawn from the switch cabinet for inspection, maintenance, or replacement.

Figure 1:
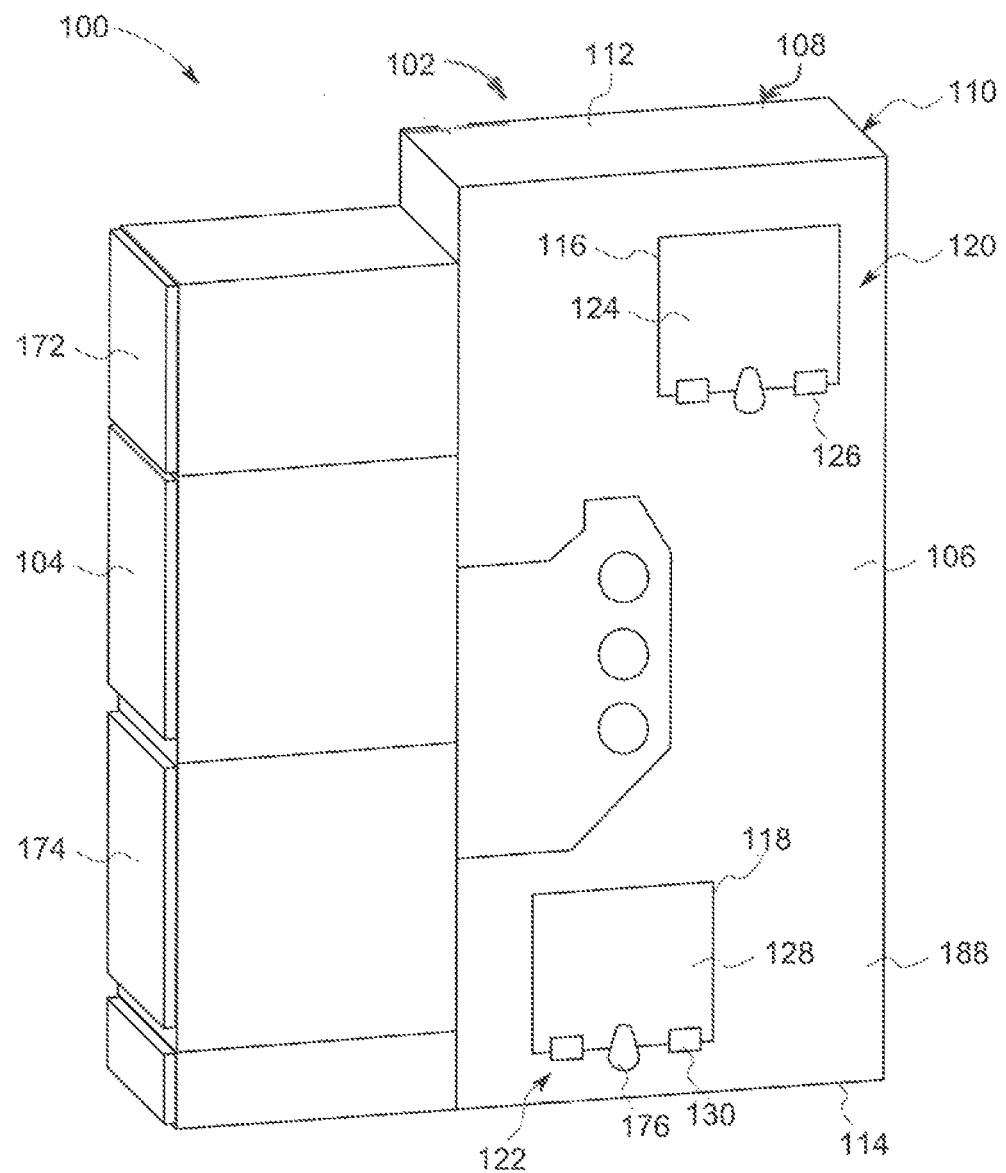
FIG. 1 is a perspective view of an exemplary switch cabinet for use with an exemplary switch device.

FIG. 1 is a perspective view of an exemplary switch device 100 that includes a switch cabinet 102. In the exemplary embodiment, switch cabinet 102 includes a front panel 104, a first side panel 106, an opposing second side panel 108, a rear panel 110, a top panel 112, and a bottom panel 114. Panels 104, 106, 108, 110, 112, and 114 combine to define an interior chamber (not shown in FIG. 1) of cabinet 102. Side panel 106 includes a first opening 116 and a substantially similar second opening 118 defined therein.

In the exemplary embodiment, switch cabinet 102 includes a first component removal system 120 coupled to side panel 106 proximate first opening 116 and a second, substantially similar, component removal system 122 coupled to side panel 106 proximate second opening 118. First component removal system 120 includes a first hatch panel 124 positioned within first opening 116 via at least one hinge 126. Similarly, second component removal system 122 includes a second hatch panel 128 positioned within second opening 118 via at least one hinge 130.

Figure 2:
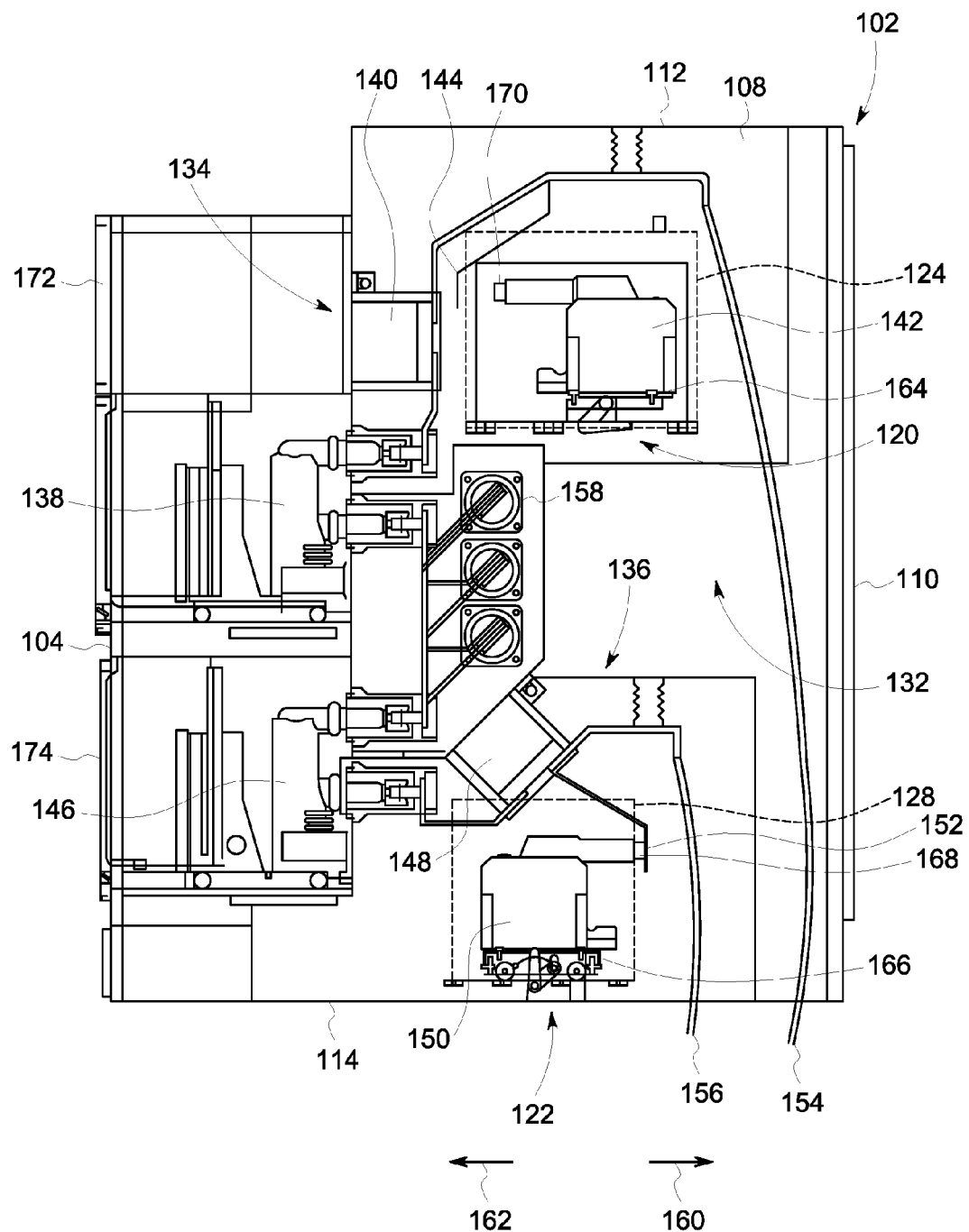
FIG. 2 is a side view of an interior of the switch cabinet illustrating a plurality of switch units housed therein.
Figure 3:
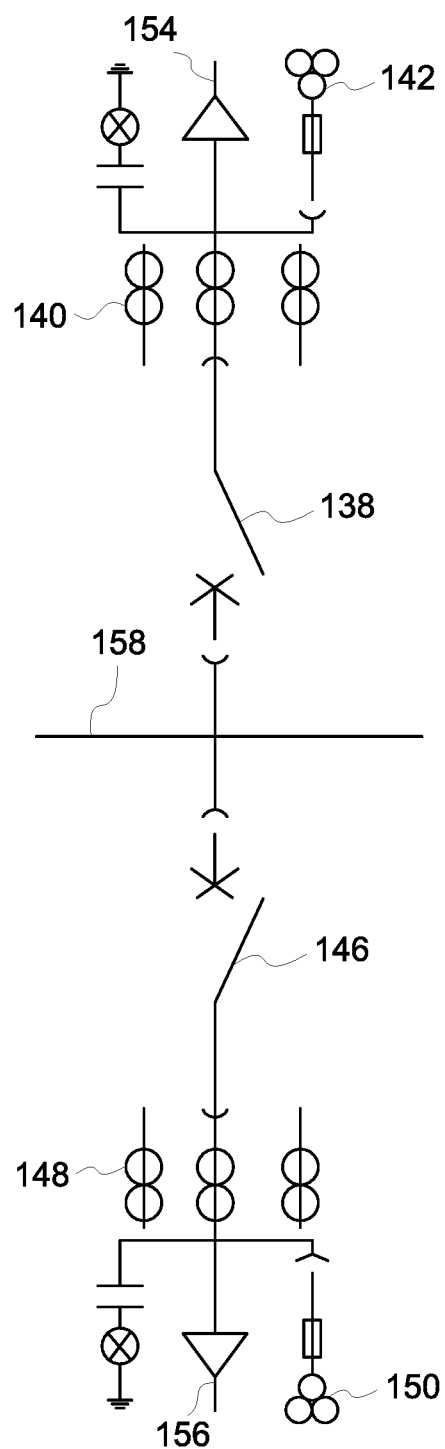
FIG. 3 shows the line connection of the switch device shown in FIG. 2.

FIG. 2 is a side view of switch cabinet 102 having side panel 106 removed to illustrate an interior chamber 132, although panel openings 116 and 118 are shown in broken line for reference. FIG. 3 shows the line connection of switch device 100. In the exemplary embodiment, switch cabinet 102 includes a first switch unit 134 and a second switch unit 136. Although FIG. 3 shows switch cabinet 102 housing two switch units, switch cabinet 102 may house any number of switch units. First switch unit 134 includes a first circuit breaker 138, a first current transformer 140, a first voltage transformer 142, and a first bus bar 144. Similarly, second switch unit 136 includes a second circuit breaker 146, a second current transformer 148, a second voltage transformer 150 and a second bus bar 152. First and second circuit breakers 138 and 146 are coupled to first and second current transformers 140 and 148, respectively. First and second current transformer 140 and 148 are then coupled to first and second bus bars 144 and 152, respectively. First and second bus bars 144 and 152 are then coupled to first and second voltage transformers 142 and 150, respectively.

First and second switch units 134 and 136 also include incoming power lines that provide electrical power to switch device 100. More specifically, first switch unit 134 includes a first inlet line 154 and second switch unit 136 includes a second inlet line 156. In one embodiment, first inlet line 154 is supplied from a municipal power supply and second inlet line 156 is supplied by a generator. For example, with respect to second switch unit 136, electrical power is transmitted from second inlet line 156 to second current transformer 148 and flows through second circuit breaker 146 to a circuit 158 for output to an electrical load (not shown). Electrical power from first inlet line 154 follows a similar path through first switch unit 134 to circuit 158.

In the exemplary embodiment, each of first and second component removal systems 120 and 122, the respective components thereof, is selectively movable in the directions of arrows 160 and 162 between a first position and a second position. When first and second component removal systems 120 and 122 are in the first position, first and second hatch panels 124 and 128 are positioned within respective openings 116 and 118 (shown in FIG. 1) such that first and second voltage transformers 142 and 150 cannot be withdrawn from chamber 132 through first and second openings 116 and 118. However, when first and second component removal systems 120 and 122 are in the second position, first and second hatch panels 124 and 128 are removed from respective openings 116 and 118 to enable access to and withdrawal of first and second voltage transformers 142 and 150 from chamber 132 through first and second openings 116 and 118. For example, in FIG. 2, second component removal system 122 is shown in the first position where second voltage transformer 150 is in a connected position to second bus bar 152 to complete the circuit and provide electrical power to circuit 158. Furthermore, first component removal system 120 is shown in the second position where first voltage transformer 142 is in a disconnected position from first bus bar 144 to disrupt the flow of electrical power through first switch unit 134.

In the exemplary embodiment, first and second component removal systems 120 and 122 include a first tray 164 and a second tray 166, respectively. First voltage transformer 142 is coupled to first tray 164 and second voltage transformer 150 is coupled to second tray 166. Each of trays 164 and 166 moves back and forth along directions 160 and 162 between the first position, associated with direction 160, and the second position, associated with direction 162, to drive voltage transformer 142 or 150 mounted thereon to move between the connected position and the disconnected position. For example, moving second tray 166 in direction 160 toward rear panel 110 causes a contact 168 of second voltage transformer 150 to contact second bus bar 152, while moving second tray 166 in direction 162 causes contact 168 to disconnect from second bus bar 152. Similarly, moving first tray 164 in direction 160 toward rear panel 110 causes a contact 170 of first voltage transformer 150 to disconnect from first bus bar 144, while moving first tray 164 in direction 162 causes contact 170 to contact first bus bar 144. Although, as shown in FIG. 2, moving component removal systems 120 and 122, and therefore, their corresponding voltage transformers 142 and 150, in the same direction causes an opposite effect, component removal systems 120 and 122 may be configured and oriented such that moving system 120 and 122 in the same direction has the same effect. Generally, component removal systems 120 and 122 may be configured and oriented in any manner on switch cabinet 102 to facilitate operation of switch device 100 as described herein.

In the exemplary embodiment, front panel 104 includes a first front hatch panel 172 and a second front hatch panel 174, which, once opened, allow first and second circuit breakers 138 and 146 to enter and exit chamber 132 of switch cabinet 102 therethrough. As such, switch cabinet 102 includes at least one side opening and at least one front opening that both enable the insertion and withdrawal of various electrical components therethrough.

Figure 4:
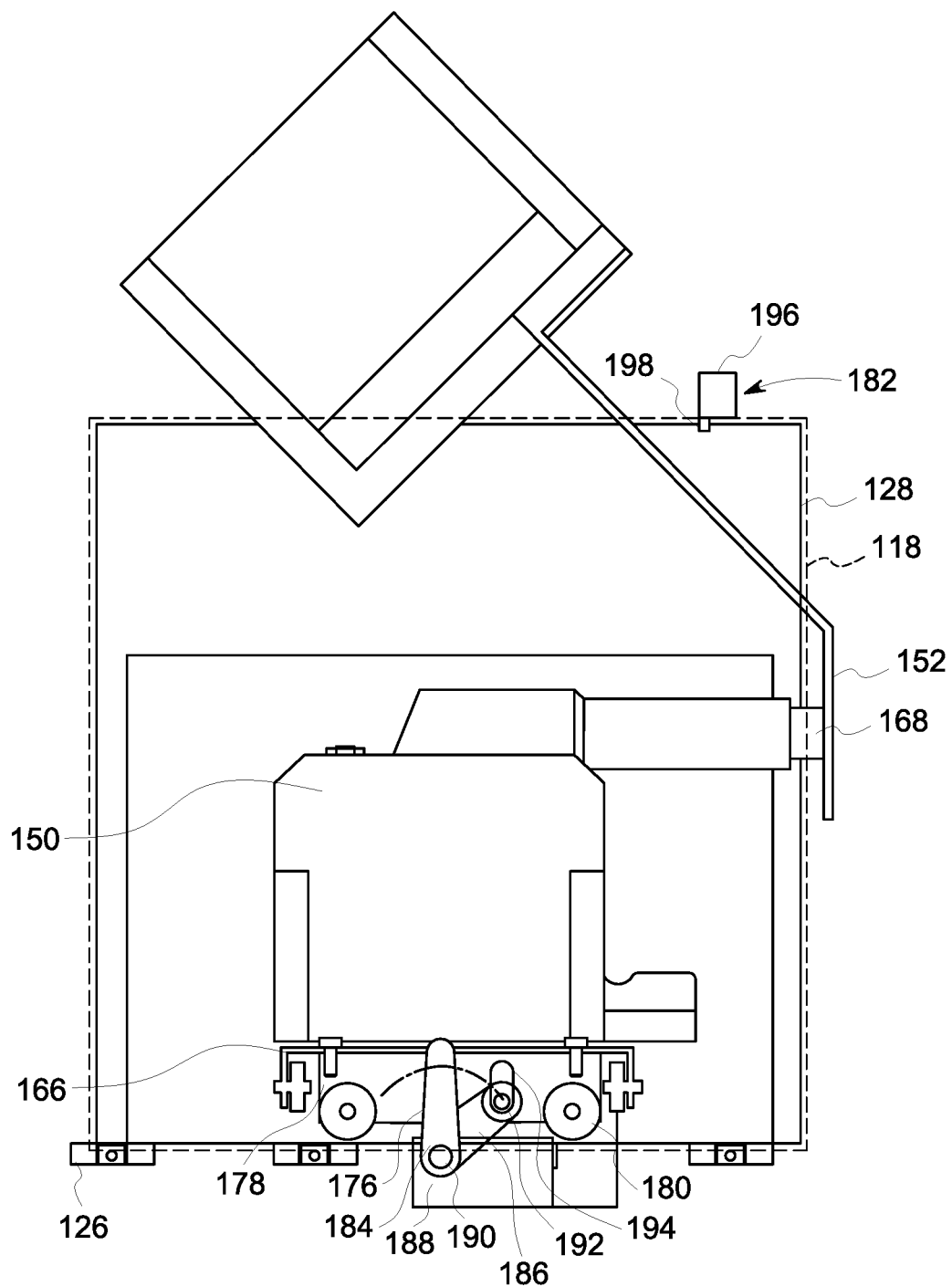
FIG. 4 is an enlarged view of a portion of the switch cabinet interior illustrating an exemplary component removal system and a voltage transformer in a first position.
Figure 5:
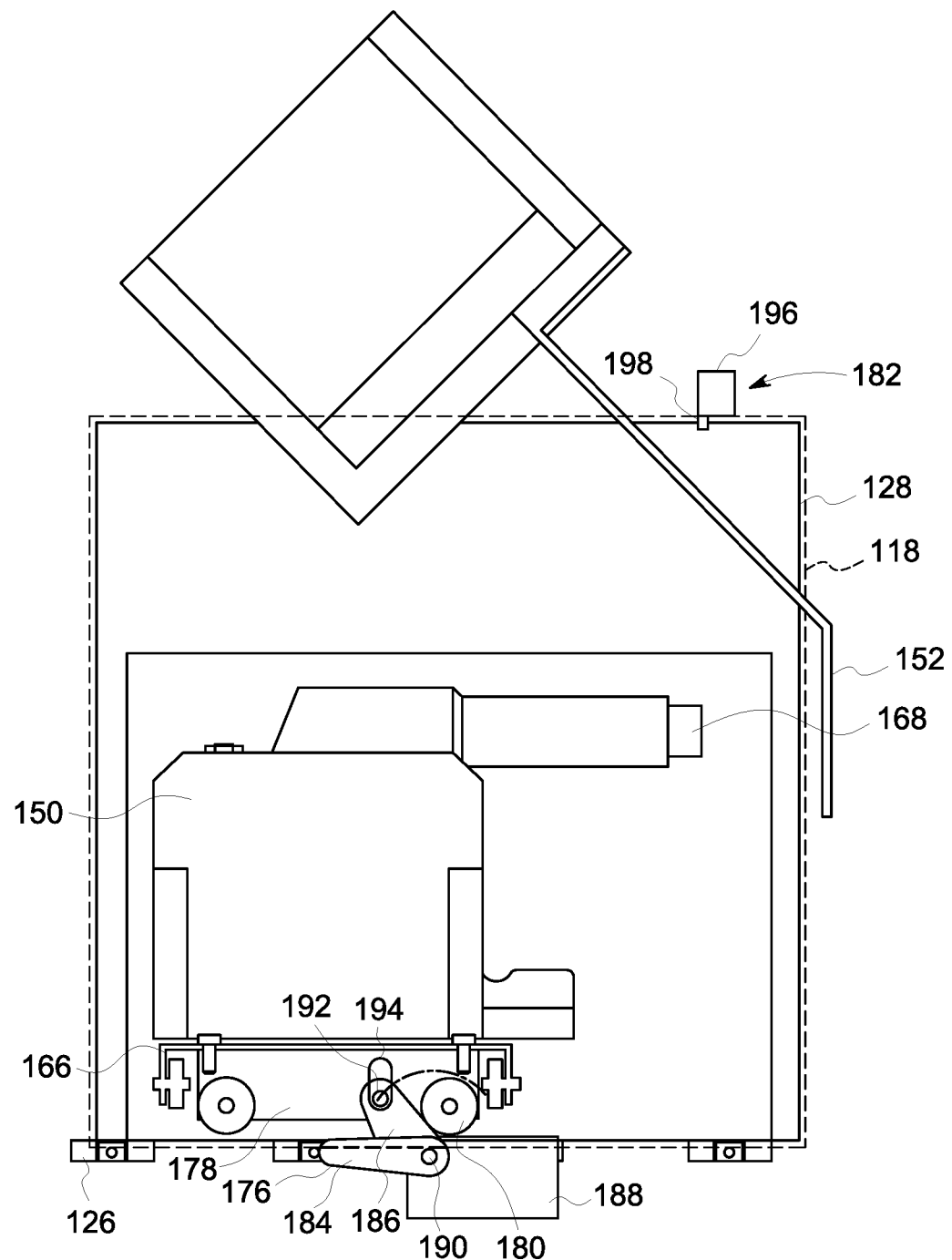
FIG. 5 is an enlarged view of a portion of the switch cabinet interior illustrating the component removal system and the voltage transformer in a second position.

As first and second component removal systems 120 and 122 have substantially the same structures and mechanisms, second component removal system 122 will be described below in detail as an example. FIG. 4 is an enlarged view of second switch unit 136 within interior chamber 132 of switch cabinet 102 illustrating second component removal system 122, and its components, in the first position and second voltage transformer 150 in the connected position. FIG. 5 is an enlarged view of second switch unit 136 within interior chamber 132 of switch cabinet 102 illustrating second component removal system 122, and its components, in the first position and second voltage transformer 150 in the disconnected position.

In the exemplary embodiment, second component removal system 122 includes an actuator 176, a mounting plate 178, a plurality of wheels 180, an electromagnetic lock 182, and tray 166. Actuator 176 includes a first arm 184 and a second arm 186 coupled to first arm 184. First arm 184 is coupled to an outer surface 188 of side panel 106 such that first arm 184 is positioned external from chamber 132. Second arm 186 is coupled an inner surface (not shown) of side panel 106 such that second arm 186 is positioned within chamber 132. As such, side panel 106 is coupled between arms 184 and 186 such that actuation of first arm 184 on the exterior of switch cabinet 102 causes actuation of second arm 186 within cabinet chamber 132, as described in detail below. More specifically, arms 184 and 186 are coupled at a pivot point 190 such that both arms 184 and 186 rotate about point 190 and do not rotate independently of one another.

When second component removal system 122 is in the first position such that voltage transformer contact 168 is in contact with bus bar 152, first arm 184 extends over the edge between hatch panel 128 and opening 118 such that first arm 184 retains hatch panel 128 and prevents it from being opened. When second component removal system 122 is in the second position such that voltage transformer contact 168 is in disconnected from bus bar 152, first arm 184 is rotated such that first arm 184 extends only over side panel 106 and hatch panel 128 is able to be opened.

Mounting plate 178 is releasable coupled to actuator 176 such that actuation of actuator 176 between the first position and the second position causes voltage transformer 159 to move between the connected position and the disconnected position, respectively. More specifically, actuation of actuator 176 causes movement of mounting plate 178 between the first and second positions, which causes movement of voltage transformer 150, which is mounted thereto. In the exemplary embodiment, second arm 186 includes a pin 192 that is releasably engaged with an aperture 194 defined in mounting plate 178. As such, when actuator first arm 184 is actuated, second arm 186 moves correspondingly such that pin 192, inserted into aperture 194, acts to move mounting plate 178 in direction 160 or 162 to place voltage transformer 150 in the connected position or the disconnected position. Wheels 180 are coupled to mounting plate 178 to enable movement between the first and second positions. When second component removal system 122 is in the second position and it is desired to remove hatch panel 128 from opening 118, pin 194 is able to disengage from aperture 194.

In the exemplary embodiment, electromagnetic lock 182 is coupled to both hatch panel 128 and to side panel 106. When component removal system 122 is in the first position and voltage transformer 150 is in the connected position and energized, electromagnetic lock 182 prevents hatch panel 128 from opening and locks hatch 128 within side panel 106. Alternatively, when component removal system 122 is in the second position and voltage transformer 150 is in the disconnected position and is de-energized, electromagnetic lock 182 unlocks hatch panel 128 and enables removal of panel 128 from opening 118. Electromagnetic lock 182 is a locking device that uses electromagnetism to lock hatch 128 when lock 182 is energized. Electromagnetic lock 182 includes an electromagnet 196 coupled to side panel 106 proximate opening 118 and a mating armature plate 198 coupled to hatch panel 128. When electromagnet 196 is energized, a current passing therethrough creates a magnetic flux that causes armature plate 198 to attract to electromagnet 196, creating a locking action. When electromagnet 196 is de-energized, armature plate 198 is instantly released from electromagnet 196, allowing for a quick unlocking action.

Figure 6:
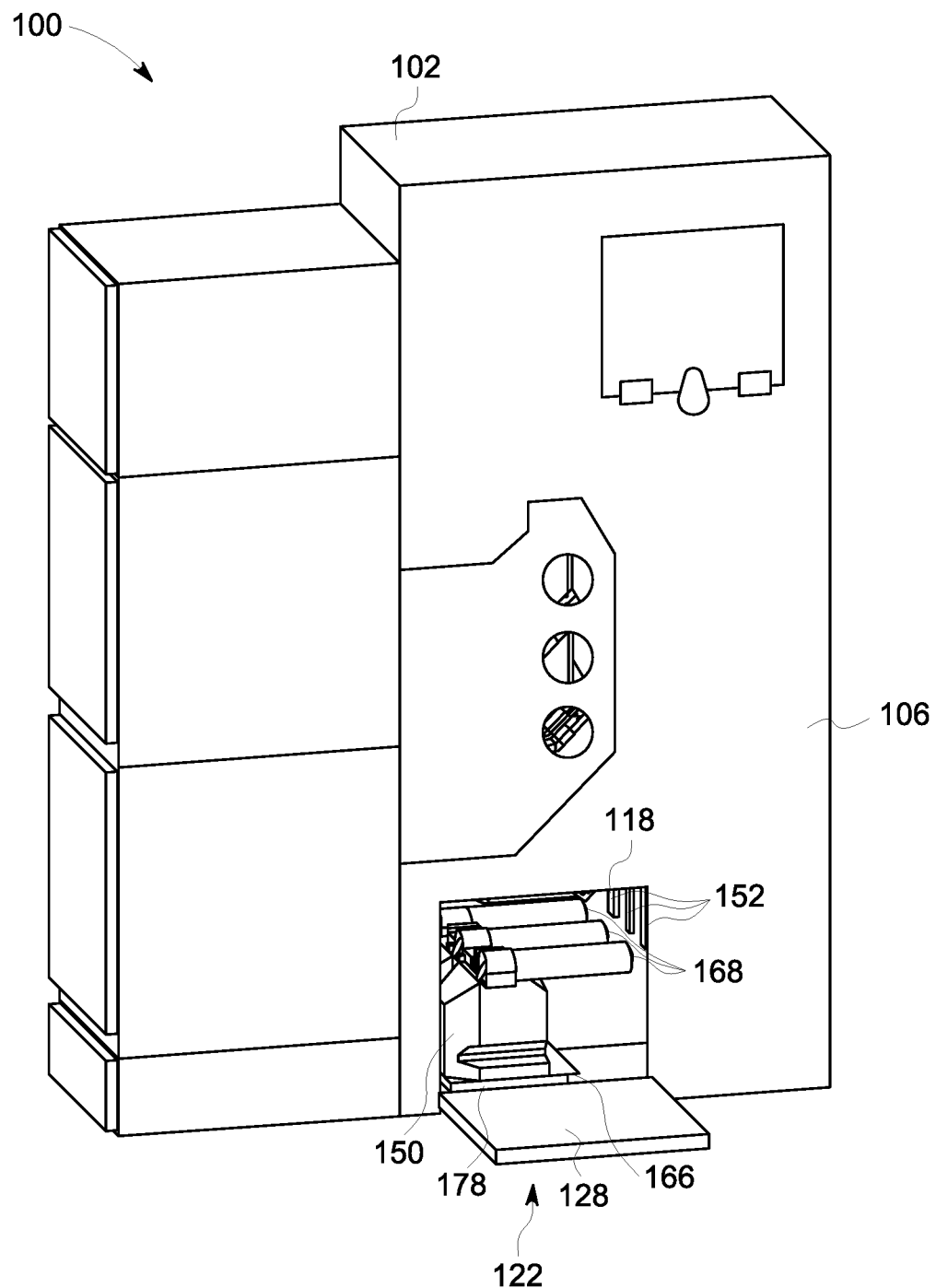
FIG. 6 is a perspective view of the switch cabinet exterior illustrating the component removal system and the voltage transformer in the second position.

FIG. 5 shows a status of the switch device 100, in which the side door 10 is opened but the voltage transformer 5 is still in the cabinet 1, whereas FIG. 6 shows a status of the switch device 100, in which the voltage transformer 5 is drawn out from the cabinet 1. When a damage or malfunction occurs to the voltage transformer 5, for example, when a fuse of the voltage transformer 5 blows due to circuit resonance or other reasons, it can be repaired or replaced conveniently by drawing out the voltage transformer 5 through the tray 26.

Figure 7:
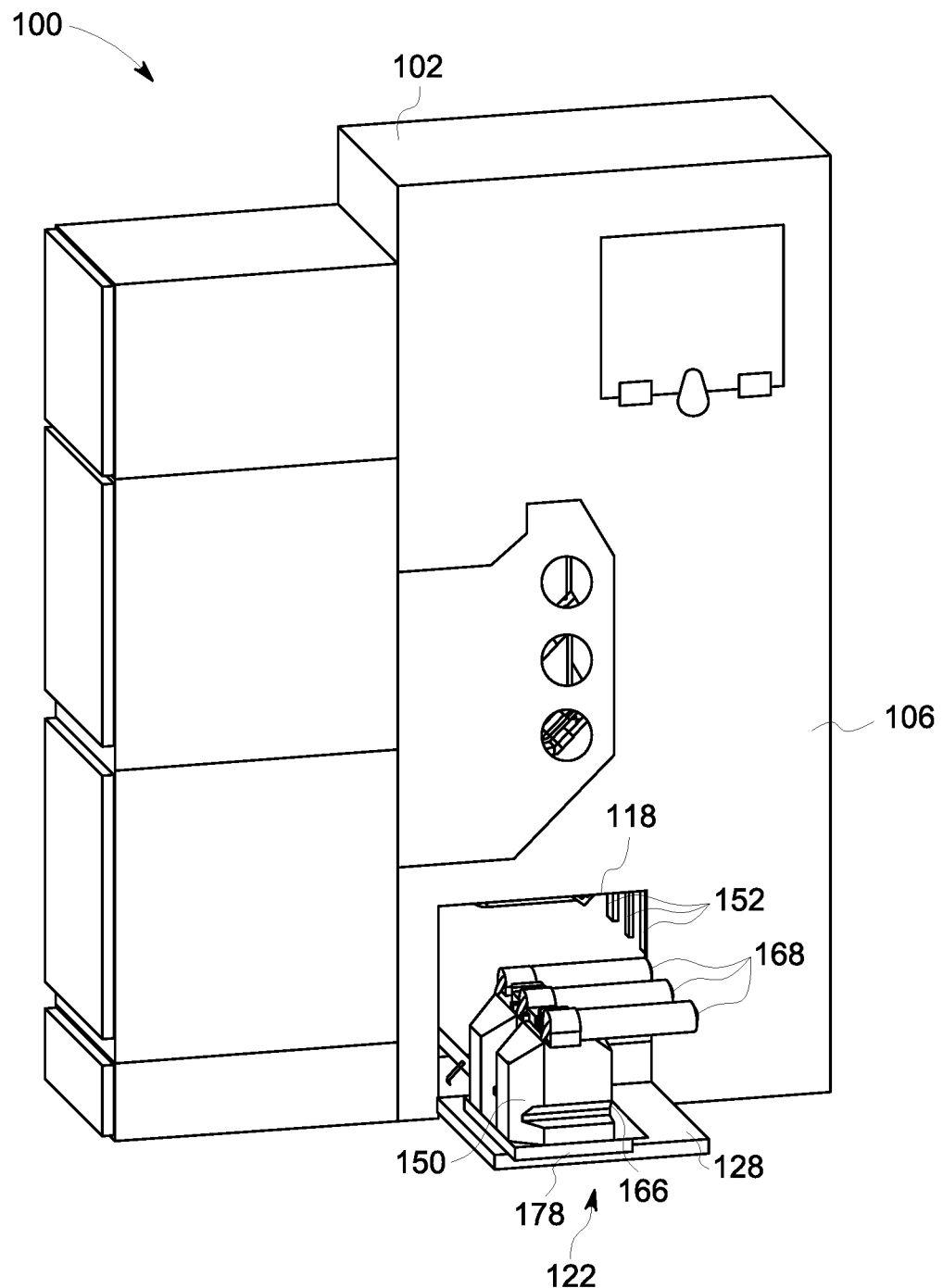
FIG. 7 is a perspective view of the switch cabinet exterior illustrating the voltage transformer in a third position in which the voltage transformer is withdrawn from the switch cabinet interior.

FIG. 6 is a perspective view of the exterior of switch cabinet 102 illustrating second component removal system 122 in the second position and second voltage transformer 150 in the corresponding disconnected position. As illustrated, hatch panel 128 is opened and voltage transformer 150 remains within chamber 132 of switch cabinet 102. FIG. 7 is a perspective view of the exterior of switch cabinet 102 illustrating second component removal system 122 in a third position and second voltage transformer 150 in a corresponding withdrawn position in which voltage transformer 150 is withdrawn from chamber 132 of switch cabinet 102. When second voltage transformer 150 requires inspection, maintenance, or replacement, second component removal system 122 is actuated from the first position to the second position, as shown and described in FIGS. 4 and 5. A technician may then engage at least one of component removal system 122 and voltage transformer 150 to slide mounting plate 178, tray 166, and voltage transformer 150 from within interior chamber 132 of switch cabinet 102 through opening 118. When component removal system 122 and voltage transformer 150 are in corresponding third and withdrawn positions, respectively, voltage transformer 150 is easily inspected, repaired, or replaced to facilitate proper operation of switch cabinet 102 and switch device 100.

The systems, method, and apparatus described herein facilitate removing an electrical component from an opening defined in a side panel of switch cabinet. In particular, the systems, method, and apparatus described herein actuate a component removal system between a first position that prevent withdrawal of the component through the opening and a second position to enable withdrawal of the component through the opening. Actuating the component removal system into the second position disconnects the electrical component and opens a hatch coupled within the side panel opening to enable the electrical component to be withdrawn from the switch cabinet for inspection, maintenance, or replacement.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A switch cabinet comprising:
   a pair of opposing side panels, wherein at least one side panel of said pair of side panels includes an opening defined therein; and
   at least one component removal system coupled to said at least one side panel, the component removal system comprising:
   an actuator coupled to said at least one side panel, said actuator comprising a first arm and a second arm coupled to said first arm, said first arm positioned on an exterior surface of said at least one side panel, and wherein said second arm is positioned on an interior surface of said at least one side panel, said second arm is releasably coupled to said mounting plate to move said mounting plate between the first position and the second position; and
   a mounting plate coupled to said actuator and to the electrical component, wherein actuation of said actuator between the first position and the second position causes the first electrical component to move between a connected position and a disconnected position, respectively, wherein said component removal system is selectively movable between a first position to prevent withdrawal of an electrical component through the opening and a second position to enable withdrawal of the electrical component through the opening.

2. The switch cabinet in accordance with claim 1, wherein said component removal system is operable to move the electrical component between a connected position when said component removal system is in the first position and a disconnected position when said component removal system is in the second position.

3. The switch cabinet in accordance with claim 2, wherein, in the connected position, the electrical component is connected to a bus bar, and in the disconnected position, the electrical component is disconnected from the bus bar.

4. The switch cabinet in accordance with claim 1, wherein said component removal system comprises a hatch panel hingedly coupled to said at least one side panel, said hatch panel positioned within the opening in the first position and removed from the opening in the second position.

5. The switch cabinet in accordance with claim 4, wherein said component removal system comprises an electromagnetic lock coupled to said hatch panel and to said at least one side panel, said electromagnetic lock configured to lock said hatch panel within the opening in the first position and to unlock said hatch panel from the opening in the second position.

6. The switch cabinet in accordance with claim 1 further comprising a front panel comprising at least one front opening defined therein, wherein a second electrical component is removable from said cabinet through the front opening.

7. A switch device comprising:
a switch cabinet comprising a pair of opposing side panels, wherein at least one side panel of said pair of side panels includes an opening defined therein;
at least one electrical component housed within said switch cabinet; and
a component removal system comprising an actuator coupled to said at least one side panel, said actuator comprising a first arm coupled to a second arm, wherein said first arm is positioned on an exterior surface of said at least one side panel, and said second arm is positioned on an interior surface of said at least one side panel,
wherein said actuator is selectively movable between the first position to place said at least one electrical component in a connected position, and the second position to move said at least one electrical component to a disconnected position, and
wherein said component removal system is selectively movable between a first position to prevent withdrawal of said at least one electrical component through the opening and a second position to enable withdrawal of said at least one electrical component through the opening.

8. The switch device in accordance with claim 7, wherein said component removal system is operable to move said at least one electrical component between a connected position when said component removal system is in the first position and a disconnected position when said component removal system is in the second position.

9. The switch device in accordance with claim 7, wherein said component removal system comprises a hatch panel hingedly coupled to said at least one side panel, said hatch panel positioned within the opening in the first position and removed from the opening in the second position.

10. The switch device in accordance with claim 9, wherein said component removal system comprises an electromagnetic lock coupled to said hatch panel and to said at least one side panel, said electromagnetic lock configured to lock said hatch panel within the opening in the first position and to unlock said hatch panel from the opening in the second position.

11. The switch device in accordance with claim 7, wherein said component removal system comprises a mounting plate coupled to said at least one electrical component, said mounting plate engaged by said actuator such that said actuator is operable to move said mounting plate between the first position and the second position.

12. A method of assembling a switch cabinet, said method comprising:
providing a pair of opposing side panels;
forming an opening in at least one side panel of the pair of side panels;
coupling a component removal system to the at least one side panel, wherein the component removal system is selectively movable between a first position to prevent withdrawal of an electrical component through the opening and a second position to enable withdrawal of the electrical component through the opening;
wherein the coupling the component removal system to the at least one side panel comprises coupling an actuator to the at least one side panel, wherein the actuator is selectively movable between the first position to place the electrical component in a connected position and the second position to move the electrical component to a disconnected position; and
wherein the coupling the actuator to the at least one side panel comprises coupling a first arm of the actuator to an exterior surface of the at least one side panel and coupling a second arm to the first arm and to an interior surface of the at least one side panel.

13. The method in accordance with claim 12, wherein the coupling the component removal system to the at least one side panel comprises hingedly coupling a hatch panel to the at least one side panel, wherein the hatch panel is positioned within the opening in the first position and removed from the opening in the second position.

14. The method in accordance with claim 12, wherein the coupling the component removal system to the at least one side panel comprises coupling a mounting plate to the electrical component, wherein the mounting plate is engaged by the actuator such that the actuator is operable to move the mounting plate between the first position and the second position.

* * * * *